US010194275B2

(12) United States Patent
Kumar et al.

(10) Patent No.: US 10,194,275 B2
(45) Date of Patent: Jan. 29, 2019

(54) INTER-NETWORK MESSAGING FOR MOBILE COMPUTING PLATFORMS

(71) Applicant: Omnitracs, LLC, Dallas, TX (US)

(72) Inventors: Vijay Kumar, San Diego, CA (US); Vish Bangalore, San Diego, CA (US)

(73) Assignee: OMNITRACS, LLC, Dallas, TX (US)

( * ) Notice: Subject to any disclaimer, the term of this patent is extended or adjusted under 35 U.S.C. 154(b) by 172 days.

(21) Appl. No.: 14/641,036

(22) Filed: Mar. 6, 2015

(65) Prior Publication Data
US 2016/0261696 A1 Sep. 8, 2016

(51) Int. Cl.
| G06F 15/16 | (2006.01) |
| H04W 4/029 | (2018.01) |
| H04W 4/02 | (2018.01) |
| H04W 4/04 | (2009.01) |
| H04W 4/20 | (2018.01) |

(52) U.S. Cl.
CPC ........... *H04W 4/029* (2018.02); *H04W 4/028* (2013.01); *H04W 4/046* (2013.01); *H04W 4/20* (2013.01)

(58) Field of Classification Search
CPC ...... G08G 1/065; G08B 13/00; H04L 67/125; H04G 7/3855
USPC ............................................ 709/204; 701/33
See application file for complete search history.

(56) References Cited

U.S. PATENT DOCUMENTS

| 5,678,196 | A * | 10/1997 | Doyle | G08G 1/202 340/993 |
| 5,922,040 | A | 7/1999 | Prabhakaran et al. | |
| 7,577,729 | B1 * | 8/2009 | Umbehocker | G06F 3/0607 709/213 |
| 8,805,932 | B2 * | 8/2014 | Ciminiera | H04L 67/104 709/204 |
| 2004/0148090 | A1 * | 7/2004 | Melen | G01C 21/26 701/482 |

(Continued)

FOREIGN PATENT DOCUMENTS

| CN | 102740286 A | 10/2012 |
| RU | 2297042 C1 | 4/2007 |

OTHER PUBLICATIONS

International Search Report of PCT/US2016/020929 dated Jun. 2, 2016.

(Continued)

*Primary Examiner* — Douglas B Blair
(74) *Attorney, Agent, or Firm* — Arent Fox LLP (57) ABSTRACT

The present disclosure generally relates to one or more methods for organizing a plurality of remote units or mobile computing platform (MCPs) associated with vehicles such that the remote units or MCPs may communicate with each other, for example, without routing messages via the back-end server. In some aspects, the remote units or MCPs may initiate the process by transmitting an awake and/or ready message to the server. The message may indicate the state of the remote unit or MCP and provide communication establishment information of the remote unit or MCP. Accordingly, the server may maintain a list of remote units or MCPs that are awake and configured for inter-network communication. In some aspects, the server may periodically distribute the compiled list of active MCPs, such that one remote unit or MCP may establish direct peer-to-peer (P2P) communication with one or more other remote units or MCPs in a fleet.

12 Claims, 6 Drawing Sheets

(56) References Cited

U.S. PATENT DOCUMENTS

| | | | |
|---|---|---|---|
| 2005/0021617 A1* | 1/2005 | Rusitschka | H04L 12/185 709/204 |
| 2006/0117026 A1* | 6/2006 | Kaler | H04L 67/104 |
| 2006/0212584 A1* | 9/2006 | Yu | G06F 17/30902 709/227 |
| 2007/0106431 A1 | 5/2007 | Tsuzuki et al. | |
| 2007/0183342 A1* | 8/2007 | Wong | H04L 29/06027 370/252 |
| 2008/0095134 A1 | 4/2008 | Chen et al. | |
| 2009/0093264 A1* | 4/2009 | Heredia | H04L 51/04 455/466 |
| 2009/0182815 A1* | 7/2009 | Czechowski, III | H04L 67/104 709/206 |
| 2009/0240758 A1* | 9/2009 | Pasko | H04L 67/104 709/201 |
| 2010/0321171 A1* | 12/2010 | Battista | G01S 5/0018 340/425.5 |
| 2011/0098877 A1 | 4/2011 | Stahlin et al. | |
| 2011/0219072 A1* | 9/2011 | Yang | H04L 29/12103 709/204 |
| 2014/0019543 A1* | 1/2014 | Hyun | H04L 67/104 709/204 |
| 2014/0244763 A1* | 8/2014 | Su | H04L 67/1057 709/205 |
| 2014/0280563 A1* | 9/2014 | El-Beltagy | H04L 67/1068 709/204 |
| 2015/0067819 A1* | 3/2015 | Shribman | H04L 67/06 726/12 |
| 2015/0312953 A1* | 10/2015 | Wang | H04L 1/00 370/312 |
| 2016/0255143 A1* | 9/2016 | Hunt | H04L 67/104 |

OTHER PUBLICATIONS

European Search Report dated Sep. 20, 2018 issued in corresponding European Application No. 18186386.1.

* cited by examiner

INTER-NETWORK MESSAGING FOR MOBILE COMPUTING PLATFORMS

BACKGROUND

Systems for tracking, managing and maintaining a fleet of portable assets generally includes one or more systems for monitoring the location of the portable asset and one or more systems for monitoring the performance of the portable asset. A system for monitoring the location of the portable asset may include a radio transmitter, a global positioning system (GPS) device, a terrestrial-based communication system such as a cellular network, or another type of communication device capable of periodically or continuously reporting its geographic location and other metrics relating to the portable asset to a receiving device. A system for monitoring the performance of the portable asset may include a number of sensors that collect and report vehicle performance data and a user interface for monitoring operator interaction with the portable asset.

In some aspects, the system for tracking, managing and maintaining the portable assets may include, but is not limited to, a remote unit referred to as a mobile computing platform (MCP) located in a cab and/or trailer of a vehicle transporting a portable asset. The MCP may communicate with a network management center (NMC) that collects and analyzes information from one or more MCPs in a fleet. An example of an MCP includes, but is not limited to, an MCP 50, an MCP 100, an MCP 110, an MCP 200, and a TT210 sold by Omnitracs, LLC of Dallas, Tex.

In some examples, remote units or MCPs may be configured to communicate only with the NMC via bidirectional links (e.g., uplink channels and/or downlink channels). Thus, there is a desire for improvement in MCP communications.

SUMMARY

The described features generally relate to one or more improved systems, methods, and/or devices for organizing a plurality of remote units or MCPs associated with vehicles such that the remote units or MCPs may communicate with each other, for example, without routing messages via the backend server (e.g., NMC). In some aspects, the remote units or MCPs may initiate the process by transmitting an awake and/or ready message to the server. The message may indicate the state of the remote unit or MCP (e.g., awake and/or ready) and provide communication establishment information of the remote unit or MCP. Accordingly, the server may maintain a list of remote units or MCPs that are awake and configured for inter-network communication. In some aspects, the server may periodically distribute the compiled list of active MCPs, such that one remote unit or MCP may establish direct peer-to-peer (P2P) communication with one or more other remote units or MCPs in a fleet. Subsequently, in one non-limiting example, MCP-to-MCP communication may be established without relying on the server for subsequent communications.

In some aspect, a method for wireless communications is described. The method may include receiving, at a network management center, a ready message from a first mobile computing platform. The ready message may indicate that the first mobile computing platform is ready to communicate with at least one second mobile computing platform. The method may further include compiling, at the network management center, a list of mobile computing platforms configured for inter-network messaging based on the ready message. In some examples, the method may include receiving a query command from the first mobile computing platform or the at least one second mobile computing platform, and disseminating the list of the mobile computing platforms configured for inter-network messaging to the first mobile computing platform or the at least one second mobile computing platform based on the query command. In one or more examples, an apparatus and/or a computer readable medium may perform the steps identified in the method of the first set of illustrative embodiments.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional component, and in which.

DETAILED DESCRIPTION

Various aspects are now described with reference to the drawings. In the following description, for purposes of explanation, numerous specific details are set forth in order to provide a thorough understanding of one or more aspects. It should be understood, however, that such aspect(s) may be practiced without these specific details.

As discussed above, the present disclosure provides a method and apparatus for organizing a plurality of remote units or MCPs associated with vehicles such that a MCP unit may communicate with at least one other MCP, such as without routing messages via the backend server (e.g., NMC). In some aspects of the present disclosure, one or more MCPs may initiate the process by transmitting an awake and/or ready message to the NMC. The message may indicate the state of the MCP (e.g., awake and/or ready) and provide communication establishment information (e.g., an IP address of the MCP). Accordingly, the NMC may maintain a list of MCP units that are awake and configured for inter-network communication. In some aspects, the NMC may periodically distribute the compiled list of active MCP units to one or more MCPs, such that one MCP may establish P2P communication with one or more other MCPs in a fleet, e.g., without relying on the NMC for subsequent communications.

Figure 1:
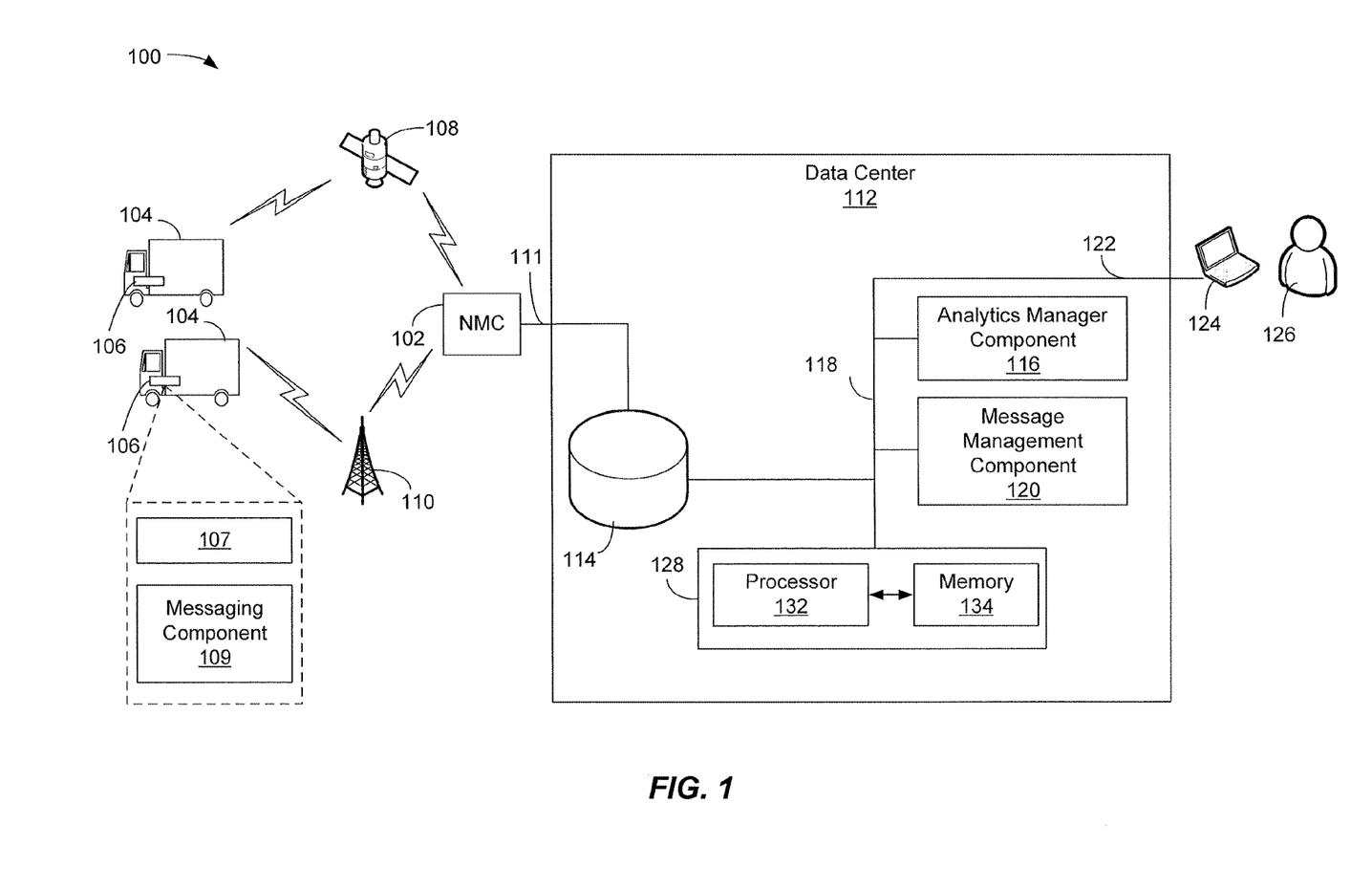
FIG. 1 is a functional block diagram of example elements of an aspect of a system for managing inter-network messaging for MCP(s) in accordance with the present disclosure.

Referring to FIG. 1, in an aspect, a system 100 includes components for inter-networking of mobile computing platforms (MCPs), as well as for collecting, analyzing and presenting fleet and/or driver management or performance data associated with each MCP. In some aspects, for example, system 100 may further be configured to organize one or more MCPs 106 to allow the MCPs to communicate with each other without relying on a host or backend server, such as network management center (NMC) 102. In an aspect, NMC 102 may be configured to communicate with one or more MCPs 106 each associated with a corresponding vehicle 104. In an aspect, the system 100 includes fleets of vehicles 104, each fleet having at least one vehicle. However, typically, a fleet could include many tens, hundreds or thousands of vehicles. An example fleet is illustrated as having vehicles 104. Additional fleets (not shown) are contemplated, but not shown. In implementations, each of the vehicles 104 can comprise MCP 106 configured to collect and transmit data associated with the operation of the vehicle 104 to the NMC 102. Also, in some implementations, MCP 106 can be configured to perform calculations associated with one or more fleet and/or driver management or performance applications 107 using any of the collected data.

Additionally, in accordance with the present disclosure, the MCP 106 may be configured with a messaging component 109 to allow inter-network (e.g., peer-to-peer (P2P)) communication between multiple MCP(s) 106, such as without routing messages via the NMC 102. In an aspect, messaging component 109 may also be referred to as, or may include, a Driver Information Exchange Application (DIEA). Further, in some implementations, MCP 106 includes a processor configured to execute messaging component 109, as well as one or more fleet and/or driver management or performance applications 107, and a memory configured to store the applications and any data associated with MCP 106. Further, in implementations, MCP 106 may include a user interface or display, a mobile application server, and a communications component (e.g., including one or more of terrestrial and Wi-Fi modems, one or more antennae, a GPS component, and a satellite communications component). For example, in an aspect, MCP 106 may include, but is not limited to, an MCP200 platform sold by OMNITRACS LLC of Dallas, Tex., which may include one or more fleet and/or driver management or performance applications 107 including but not limited to Analytics Manager, Critical Event Reporting, Driver Workflow, Extended Productivity Suite, Fault Monitoring, Hours of Service, In-Cab Navigation, In-Cab Scanning, In-Cab Video Training, Media Manager, Performance Monitoring with Fuel Manager, Predictive Performance Service, Trip Manager, Vehicle Maintenance and Inspection Reporting, and Web Browsing, as well as messaging component 109 for performing the inter-network communication aspects described herein.

As an example only, each MCP 106 may be in bi-directional communication with NMC 102 over at least one communication channel. In the example shown in FIG. 1, each vehicle 104 may be in bi-directional communication with the NMC 102 over at least one of a satellite-based communication system 108 or a terrestrial-based system 110 (e.g., GSM, CDMA, TDMA, WCDMA, EDGE, OFDM, GPRS, EV-DO, WiFi, and others). Depending on many factors, data may be exchanged with the vehicles 104 using any combination of the satellite communication system 108 and the terrestrial-based communication system 110.

In an aspect, associated with the execution of one or more fleet and/or driver management or performance applications 107, many different types of data are collected and transferred from the vehicles 104 to the NMC 102. Examples of such data include, but are not limited to, driver performance data, driver duty status, truck performance data, critical events, messaging and position data, location delivery data, and many other types of data. In some aspects, data collected from the vehicles 104 is processed by the NMC 102. The NMC 102 can be thought of as a data clearinghouse that receives all data that is transmitted to and received from the vehicles 104.

Additionally, in some aspects, one or more MCPs 106 associated with vehicles 104 may be configured with messaging component 109 to allow inter-network (e.g., P2P) communication between the MCPs, e.g., without relaying the messages via the NMC 102. For example, in an aspect, messaging component 109 may operate to send one or more configuration messages to NMC 102, where the one or more configuration messages include a "ready" message and/or an "awake" message (both described below) relating to an inter-network communication capability of the MCP. Accordingly, in these aspects, the NMC 102 (or data center 112, as described below) may maintain and/or compile a list of active MCPs 106 that are configured for inter-network messaging. In some aspects, the NMC 102, in response to receiving a query from one or more the MCPs 106, may disseminate the list of the active MCPs 106 to the one or more MCPs 106 to allow the one or more MCPs 106 to establish inter-network communication for subsequent messages without involving the NMC 102. As such, two or more MCPs 106 may communicate directly with one another, e.g., via a terrestrial-based system 110 or satellite-based communication system 108 using the information disseminated by NMC 102.

The system 100 also includes a data center 112, which may be part of or in communication with NMC 102. The data center 112 illustrates one possible implementation of a central repository for all of the data received from each of the vehicles 104. As an example, as mentioned above many different types of data are transmitted from the MCPs 106 located on vehicles 104 to the NMC 102. In the case where data center 112 is in communication with NMC 102, the data may be transmitted via connection 111 to the data center 112. The connection 111 may comprise any wired or wireless dedicated connection, a broadband connection, or any other communication channel configured to transport the data.

In an aspect, the data center 112 may include a data warehouse 114 for receiving the data from vehicles 104 relating to fleet and/or driver management or performance. In an aspect, for example, data center 112 may include any number of application servers and data stores, where each may be associated with a separate fleet and/or driver management or performance data. In an aspect, each application server and data store may include a processor, memory including volatile and non-volatile memory, operational software, a communication bus, an input/output mechanism, and other operational systems. In some examples, a first application server may be a services portal (SP) server that receives, for example, messaging and positioning (M/P) data and/or location delivery efficiency (LDE) data from each of the vehicles 104. Another application server, for example only, may include one or more servers related to safety and compliance, such as a quick deployment center (QDC) server that receives, for example, critical event (CE) data from each of the vehicles 104, or such as an hours of service (HOS) server that receives data related to, for example, duty status (DS) data such as the number of hours that a driver operates a vehicle 104. Further, for example, another application server may be a fuel cost server that receives, for example, vehicle and driver performance data related to fuel usage and/or cost from each of the vehicles 104. Additionally, for example only, another application server may relate to asset management, such as a Vehicle Maintenance and Vehicle Inspection Report server that receives, for example, maintenance and/or inspection data from each of the vehicles 104. It should be understood that the above list of example servers is for illustrative purposes only, and data center 112 may include additional and/or different application servers.

In an aspect, the data center 112 may include an analytics manager component 116 for analyzing the data in data warehouse 114 from vehicles 104 and generating fleet and/or driver management or performance metrics. For example, analytics manager component 116 may generate fleet and/or driver management or performance metrics associated with one or more applications on MCP 106.

Additionally, in accordance with the present disclosure, the data center 112 may also include a message management component 120, which may include, or which may be referred to as an MCP interworking server (MIS) configured to manage and configure all applications which will require MCP inter-networking. The message management component 120 may receive one or more configuration messages associated with inter-network messaging from the messaging component 109 associated with the MCP 106. For example, the message management component 120 may receive the "ready" message comprising an MCP communication header, message type (e.g., ready), driver name or identification, source IP address, destination IP address, MCP type, and/or application versions supported by the MCP. In some examples, the "ready" message transmitted by the messaging component 109 may indicate that the MCP 106 is ready and available to communicate directly with other MCP(s) 106 in the fleet using inter-network messaging.

Additionally or alternatively, the message management component 120 may also, periodically, receive an "awake" message from the messaging component 109 of the MCP 106. Because the MCP 106 may go out of coverage or go into sleep mode after a predetermined number of hours of driving, the messaging component 109 may utilize "awake" messages to maintain connection with the NMC 102. Accordingly, the messaging component 109 may transmit an "awake" message during periodic intervals. In some examples, the MCP 106 may transmit the "awake" message every 15 minutes. In some aspects, a user (e.g., the driver or fleet manager 126) may dynamically adjust the periodicity of transmitting "awake" messages. Similar to the "ready" message, the "awake" message may identify the MCP type, applications supported by the MCP 106, source IP address, destination IP address and the status of the MCP 106.

Based on the combination of "ready" and "awake" messages, the message management component 120 may compile a list of available and active MCP(s) 106 that are configured for inter-network messaging. In some aspects, the message management component 120 may group the one or more active MCP(s) based on location (e.g., MCP(s) 106 within a specified radius), MCP capabilities and/or fleet. Thus, in some examples, upon advertising its capabilities to the NMC 102, the MCP 106 may subsequently transmit a query command to the NMC 102. The query command may request, from the NMC 102, a list of active MCP(s) 106 associated with at least one group (e.g., location, fleet, etc.). In response, the NMC 102 may transmit a compiled list to the MCP 106, thereby allowing the MCP 106 to initiate inter-network messaging, e.g., without subsequent communication through the NMC 102. In some examples, the inter-network messaging may include a message including information such as a road safety alert, company related information, or text messages between drivers, where in some aspects the message is routed directly between the MCP(s) 106 without NMC 102 intervention. In some examples MIS may be responsible for grouping a plurality of MCP(s) 106 based on configuration parameters received from fleet owners. Thus, in some examples, the MIS may maintain a list of participating MCP(s) 106 based on grouping organized by MIS.

Additionally or alternatively, an analytics manager component 116 may implement a set of routines that may receive data from data warehouse 114 over connection 118. The analytics manager component 116 may capture, manipulate, and provide this data in a usable format, for example, over connection 122 for display on a terminal device 124. The terminal device 124 can be a user interface portal, a web-based interface, a personal computer (PC), a laptop, a personal data assistant (PDA), a dedicated terminal, a dumb terminal, or any other device over which a fleet manager 126, such as a manager or operator responsible for monitoring a fleet of vehicles 104, can view the display provided by the terminal device 124. In an aspect, analytics manager component 116 is an analysis engine defined by or operating via an execution system 128, for example, connected via a system bus 130. In an aspect, the execution system 128 includes a processor 132 and a memory 134. The memory can store the routines that are associated with analytics manager component 116 and message management component 120. In an aspect, the processor 132 can execute the stored routines to implement the functionality of analytics manager component 116 and message management component 120 that are described herein. In another aspect, the functionality of analytics manager component 116 and message management component 120 as described herein may be implemented in one or more hardware or firmware processor modules of processor 132. Although shown as residing within the data center 112, the execution system 128 may reside elsewhere, and may be implemented as a distributed system in which the processor 132 and the memory 134 are located in different places.

Figure 2:
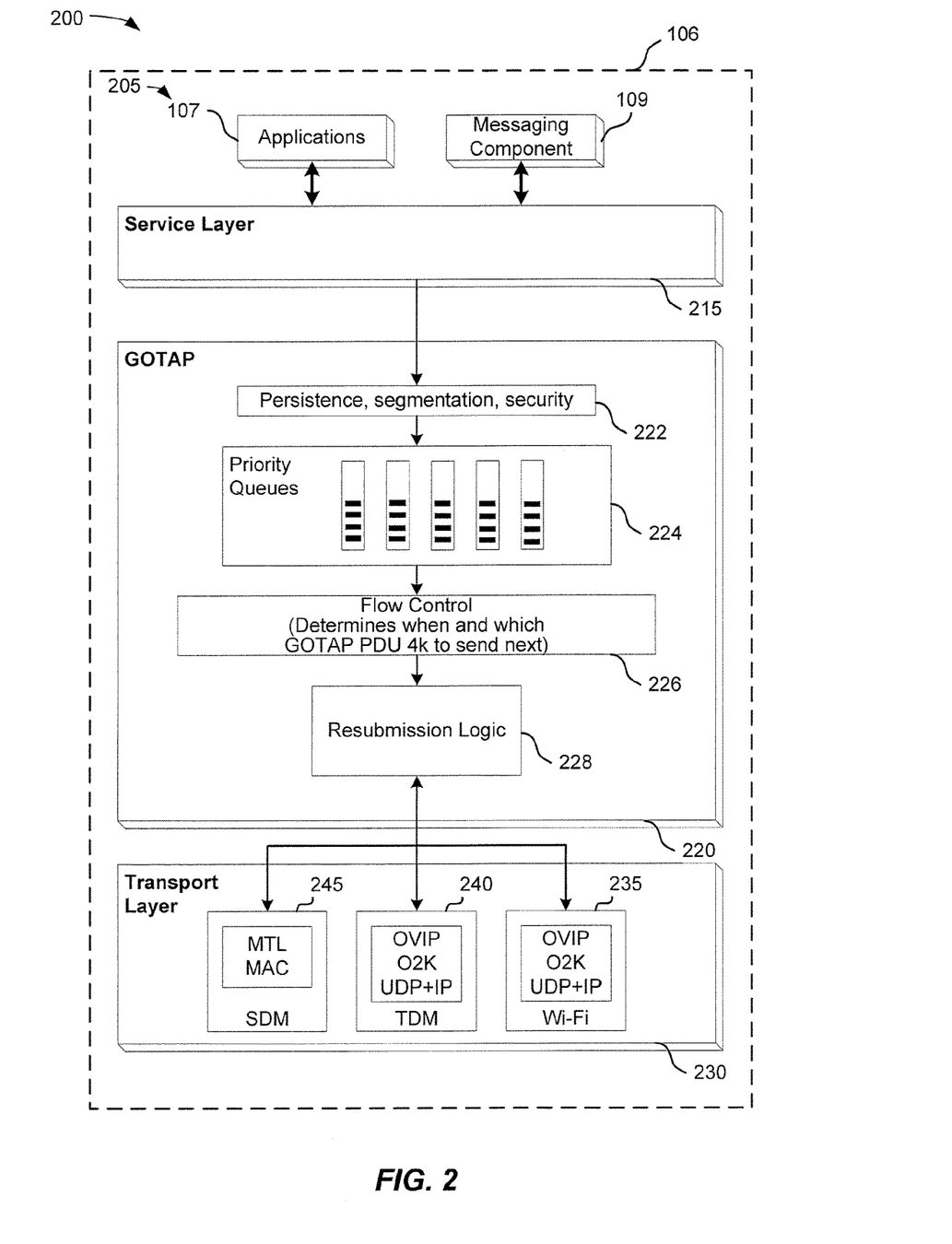
FIG. 2 is a schematic diagram of an aspect of MCP described in accordance with the present disclosure.

Referring to FIG. 2 a schematic diagram 200 of elements of the MCP 106 may include one or more applications 205 executed on the processor of the MCP 106. In some instances, applications 205 may include messaging component 109 for inter-network messaging and/or one or more fleet and/or driver management or performance applications 107. As noted above, messaging component 109 may include or may be referred to as a driver information exchange application (DIEA) that allows MCPs 106 to communicate directly with one another, e.g., without such communications being relayed through NMC 102 (FIG. 1).

In some instances, the applications 205 such as messaging component 109 may utilize the service layer 215 illustrated in FIG. 2 for transmitting and/or receiving messages to and/or from the NMC 102 and to and/or from other MCP(s) 106. For example, in an aspect, service layer 215 is a protocol layer that provides an interface to one or more lower protocol layers. In some aspects, service layer 215 may support messaging, configuration data distribution (CDD) and group based messaging.

Following the service layer 215, the message may flow through a generic over the air protocol (GOTAP) layer 220. The GOTAP layer 220 may be responsible for selecting the transport and using the corresponding protocol to transmit the message to the NMC 102 and/or other MCP 106. In some instances, the GOTAP layer 220 may interface with multiple over the air (OTA) protocols. In some instances, the GOTAP layer 220 may be responsible for implementing persistence, priority, segmentation, encryption and security protocols 222. In one example, the GOTAP layer 220 may include a flow control entity 226, as well as resubmission logic 228, that may be responsible for picking the transport mechanism and making sure that every message is transmitted (or retransmitted) successfully and in-order over the selected transport mechanism based on a priority queue 224 that stores one or more messages for transmission.

Based on the transport selection by the GOTAP layer, the message may be forwarded to transport layer 230. In some examples, the transport layer 230 may support a plurality of protocols for communicating via a communications component (e.g., including one or more of a terrestrial modem 240 and Wi-Fi modem 235, one or more antennae, a GPS component, and a satellite communications component 245). It should be mentioned that any data relating to fleet performance, vehicle performance, driver performance, location delivery performance, fuel efficiency, and a number of other fleet vehicle performance parameters may be communicated in real-time.

Figure 3:
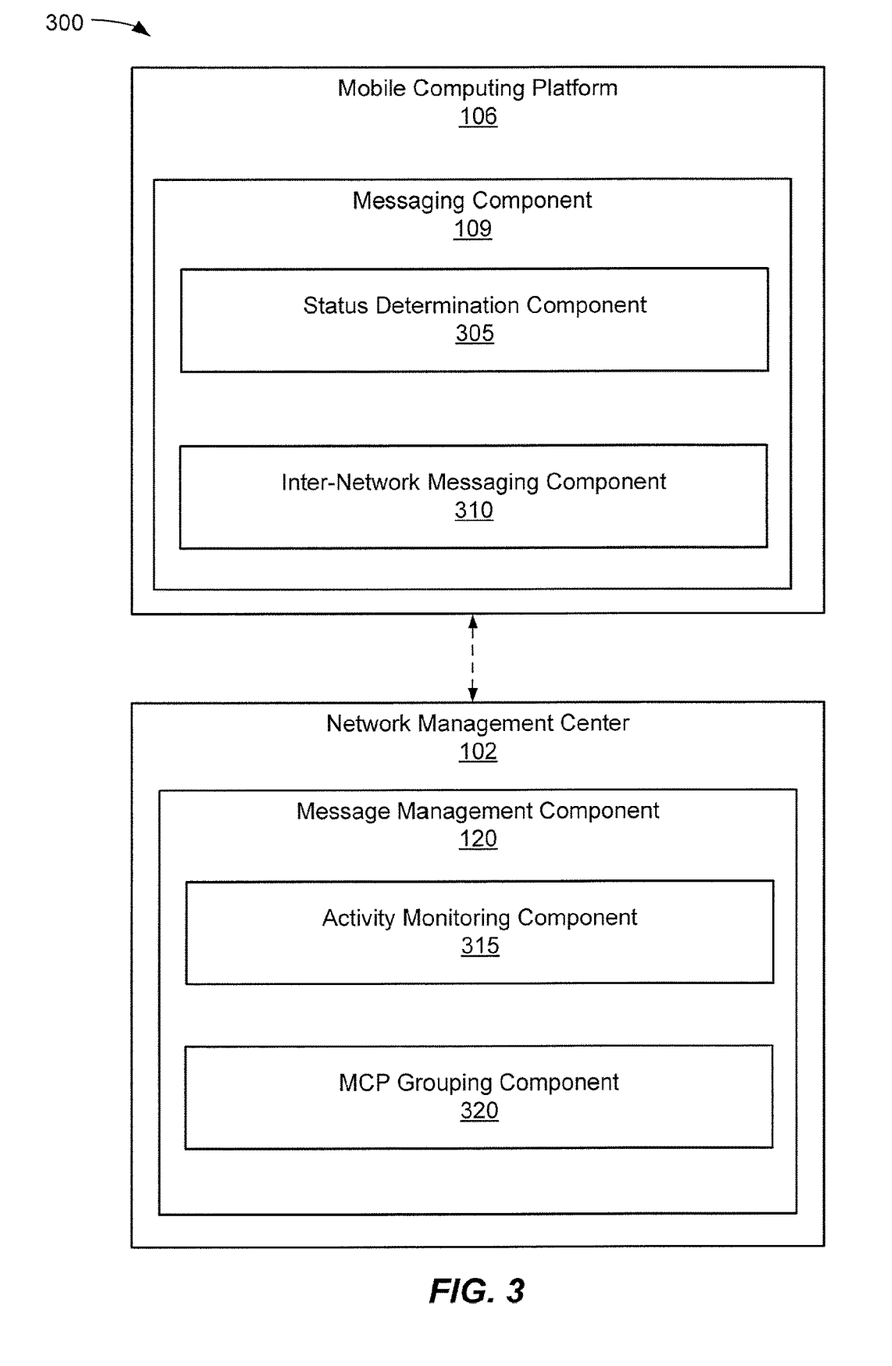
FIG. 3 is a schematic diagram of the subcomponents of an aspect of the system for managing inter-network messaging for MCP(s) in accordance with the present disclosure.

Referring to FIG. 3, a subset 300 of system 100 highlights subcomponents of an aspect of MCP 106 and NMC 102 as discussed with reference to FIGS. 1-2 above. In accordance with the present disclosure, the messaging component 109 may include a status determination component 305 for monitoring the status of the MCP 106. In some examples, the status determination component 305 may generate messages (e.g., ready and/or awake messages) to be transmitted to the message management component 120 associated with the NMC 102. Additionally or alternatively, the inter-network messaging component 310 may be configured to identify active MCP(s) 106 for inter-network messaging and establishing communication with one or more MCP(s) 106. In some examples, the inter-network messaging component 310 may transmit a query command to the message management component 120 to request a list of active MCP(s) 106 based on at least one criterion. The criterion may request a list of all active MCP(s) 106, or all active MCP(s) 106 within, for example, an identified distance of the requesting MCP 106, or within a same fleet, or of a same MCP type, or to get a list of one or more MCP(s) 106 based on one or more corresponding Unified Addresses (UAs), or to get a list of one or more MCP(s) 106 based on one or more corresponding driver names/IDs. Additionally or alternatively, the inter-network messaging component 310, upon receiving a response message from the message management component 120, may initiate direct communication with other MCP(s) 106 without relaying subsequent messages through the NMC 102.

In some aspects, the message management component 120 may include an activity monitoring component 315. In some examples, the message management component 120 may be part of the NMC 102 or the MIS discussed above. The activity monitoring component 315 may receive one or more messages (e.g., ready and awake messages) from the status determination component 305 of the MCP 106. Based on receiving the messages, the MCP grouping component 320 may compile a list of active MCP(s) 106 configured for inter-network messaging. In some examples, the MCP grouping component 320 may group the one or more MCP(s) 106 based on grouping rules, which may include rules such as but not limited to grouping by location, by fleet, by MCP type, based on one or more corresponding Unified Addresses (UAs), based on one or more corresponding driver names/IDs, or any combination thereof In some examples, the MCP grouping component 320 may filter the plurality of active and ready MCP(s) based on one or more parameters identified in the query command received from the messaging component 109. Accordingly, in one example, the MCP grouping component 320 may transmit a list of active and ready MCP(s) 106 to the requesting MCP (106) based on the parameters requested by the inter-network messaging component 310.

Figure 4:
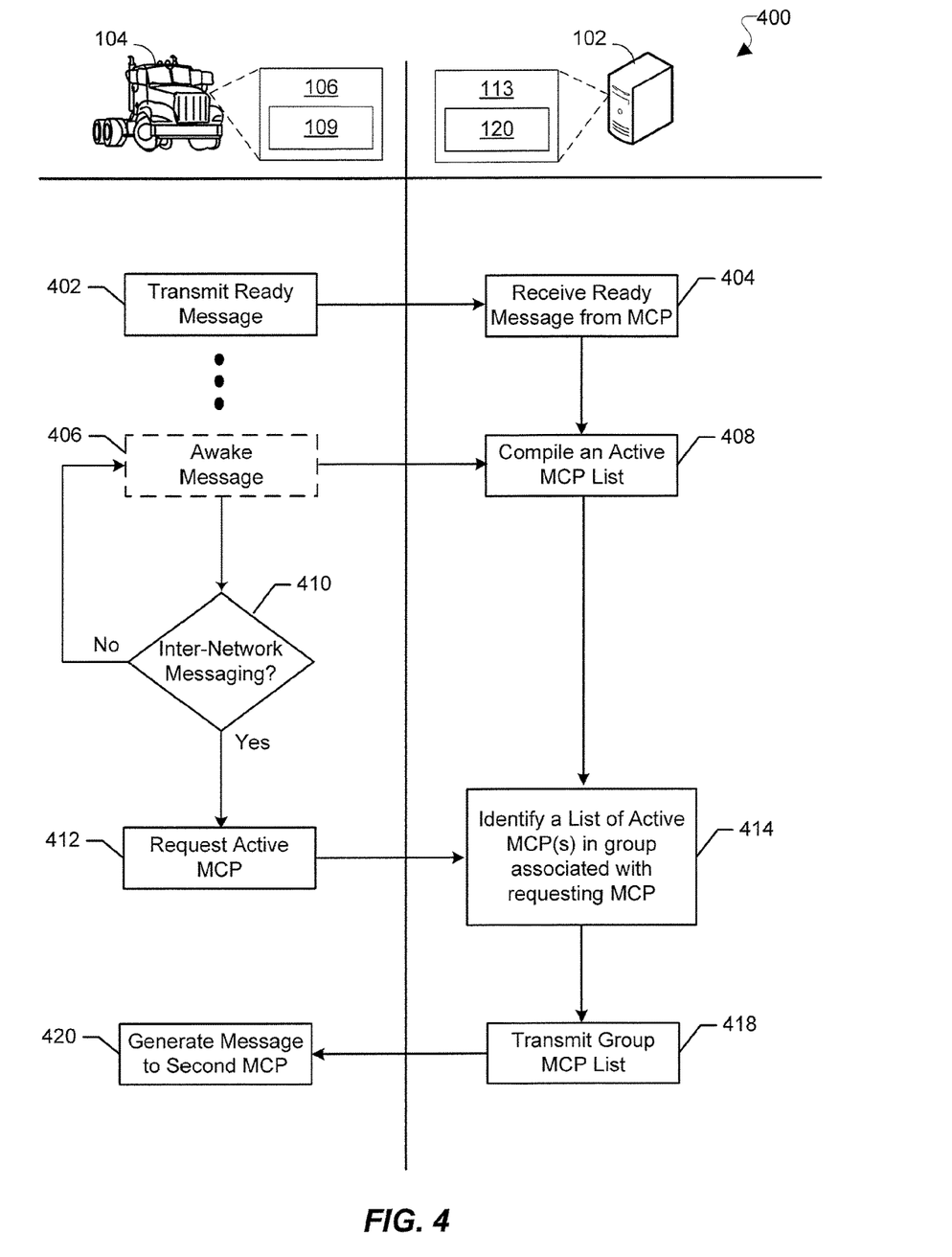
FIG. 4 is a flowchart of an example of an aspect of a method managing inter-network messaging for MCP(s) in accordance with the present disclosure.

Referring to FIG. 4, an example of a method 400 for managing inter-network messaging of MCP(s) 106 in accordance with the present disclosure includes an interaction between the NMC 102 and an MCP 106 associated with a vehicle 104. In some aspects, the MCP 106 may include a messaging component 109 described with reference to FIGS. 1-3. Additionally or alternatively, the NMC 102 may include a message management component 120 described with reference to FIGS. 1-3.

At block 402, the method 400 may be initiated by the MCP 106 by transmitting a ready message to the NMC 102. In some examples, the status determination component 305 may be configured to generate the ready message. Additionally or alternatively, the communications component 515 (FIG. 5) may transmit the generated ready message over a communication medium to the NMC 102.

At block 404, the ready message may be received by the message management component 120 associated with the NMC 102. In some examples, the communications component 605 (FIG. 6) associated with the NMC 102 may be configured to receive the generated message over a communication medium at the NMC 102.

In some examples, the MCP 106 associated with vehicle 104 may, at times, go outside the wireless communication coverage area and/or enter sleep mode. Leaving the coverage area and/or entering the sleep mode may cause the MCP 106 to disconnect from the NMC 102. Therefore, in order to maintain an active connection, the MCP 106, at block 406, may optionally transmit an awake message to the NMC 102. In some aspects, the status determination component 305 may be configured to generate the awake message. Additionally or alternatively, the communications component 515 (FIG. 5) may transmit the generated awake message over a communication medium to the NMC 102.

At block 408, upon receiving the ready message or the awake message from at least one MCP 106, the method 400 may include compiling a list of active MCP(s) that are ready to participate in inter-network messaging. In some aspects, activity monitoring component 315 may be configured to process aspects of block 408. In some examples, if the MCP 106 fails to maintain an active connection with the NMC 102 (via periodic transmission of awake messages), the activity monitoring component 315 may remove the inactive MCP 106 from the compiled list.

At block 410, the messaging component 109 may determine whether to initiate inter-network messaging. If the messaging component 109 determines not to initiate the inter-network messaging, the messaging component 109 may return to block 406 to continue transmitting awake messages during a predetermined time interval. Alternatively, if the messaging component 109, at block 410, determines to initiate inter-network messaging, the messaging component 109, at block 412 may request a compiled list of active MCP(s), which may be further based on at least one parameter, by transmitting a query command to the NMC 102. The at least one parameter may comprise the geolocation of other MCP(s), type of MCP(s), fleet association, a Unified Address (UA), a driver name/ID, or any combination thereof.

At block 414, the message management component 120 may receive the query command from the messaging component 109 and, in an aspect, may filter the list of active MCP(s) to identify MCP(s) in at least one group based on the received parameter(s). In some examples, the MCP grouping component 320 may be configured to compile a list of active MCP(s) that satisfy the parameters identified by the messaging component 109.

Accordingly, at block 418, the message management component 120 may transmit the compiled a list of active MCP(s) of a group that satisfy the parameters identified by the messaging component 109. In some aspects, the communications component 605 (FIG. 6) may be configured to transmit the compiled list to the MCP 106. In an aspect, the compiled a list of active MCP(s) may include communication establishment information associated with an identified MCP to enable direct communication with the listed MCP. In one or more examples, communication establishment information may include an IP address.

At block 420, the MCP may generate a message to at least one second MCP selected from the list provided by the message management component 120. In some examples, the generated message may be transmitted directly to the second MCP, e.g., without being relayed via the NMC 102, based on use of the IP address in the generated message. For example, in an aspect, MCP 106 may transmit the generated message to the second MCP via terrestrial system 110 or satellite system 108. In some aspects, the inter-network messaging component 310, in collaboration with communications component 515 (FIG. 5), may be responsible for transmitting messages to other MCP(s) without involvement of NMC 102.

Figure 5:
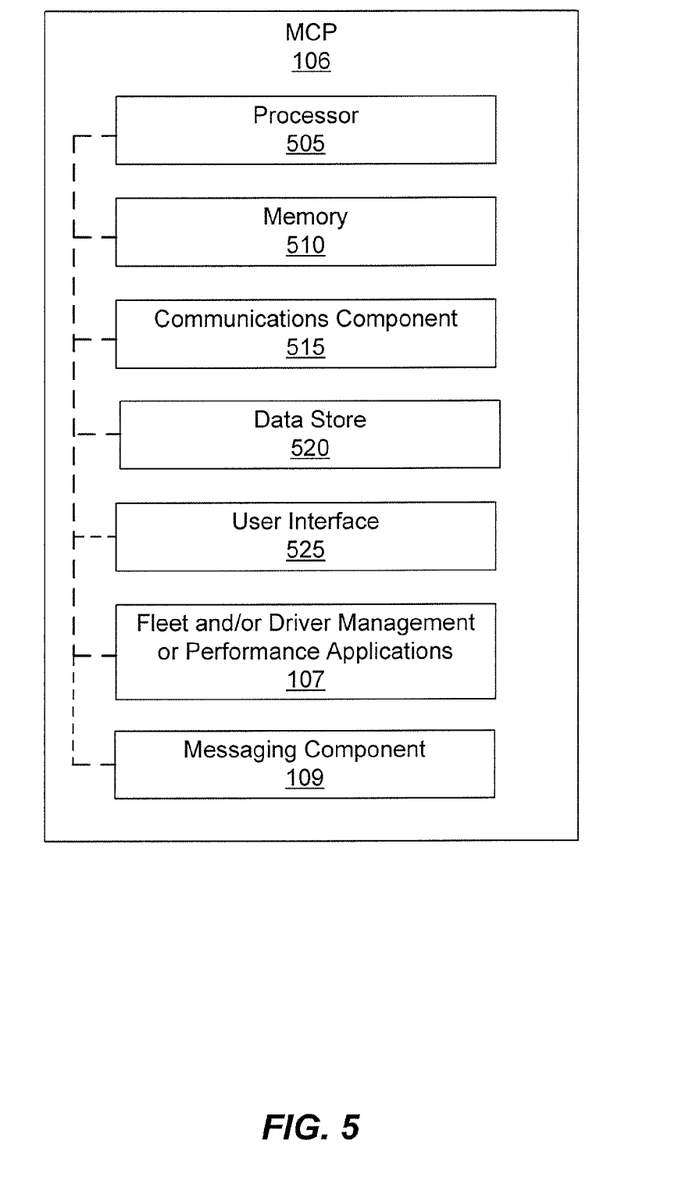
FIG. 5 is a block diagram of an example of an aspect of a mobile computing platform with a messaging component in accordance with the present disclosure.

FIG. 5 illustrates an example of MCP 106 for inter-network messaging in accordance with the present disclosure. In one aspect, the MCP 106 may include a processor 505 that may be or may include a specially programmed or configured computer device to perform the functions described herein. In one aspect of implementation, MCP 106 may include messaging component 109 and its sub-components, such as in specially programmed computer readable instructions or code, firmware, hardware, or some combination thereof.

In an aspect, for example as represented by the dashed lines, features described herein may be implemented in or executed using one or any combination of processor 505, memory 510, communications component 515, and data store 520. For example, messaging component 109 may be defined or otherwise programmed as one or more processor modules of processor 505. Further, for example, messaging component 109 may be defined as a computer-readable medium (e.g., a non-transitory computer-readable medium) stored in memory 510 and/or data store 520 and executed by processor 505. Moreover, for example, inputs and outputs relating to operations of messaging component 109 may be provided or supported by communications component 515, which may provide a bus between the components of computer device or an interface for communication with external devices or components.

In some aspects, MCP 106 may include processor 505 specially configured to carry out processing functions associated with one or more of components and functions described herein. Processor 505 can include a single or multiple set of processors or multi-core processors. Moreover, processor 505 can be implemented as an integrated processing system and/or a distributed processing system.

The MCP 106 further includes memory 510, such as for storing data used herein and/or local versions of applications and/or software and/or instructions or code being executed by processor 505, such as to perform the respective functions of the respective entities described herein. Memory 510 can include any type of memory usable by a computer, such as random access memory (RAM), read only memory (ROM), tapes, magnetic discs, optical discs, volatile memory, non-volatile memory, and any combination thereof.

Further, MCP 106 may include communications component 515 that provides for establishing and maintaining communications with one or more parties utilizing hardware, software, and services as described herein. Communications component 515 may carry communications between components on MCP 106, as well as between user and external devices, such as devices located across a communications network and/or devices serially or locally connected to MCP 106. For example, communications component 515 may include one or more buses, and may further include transmit chain components and receive chain components associated with a transmitter and receiver, respectively, or a transceiver, operable for interfacing with external devices.

Additionally, MCP 106 may further include data store 520, which can be any suitable combination of hardware and/or software, that provides for mass storage of information, databases, and programs employed in connection with aspects described herein. For example, data store 520 may be a data repository for applications not currently being executed by processor 505.

MCP 106 may additionally include a user interface component 525 operable to receive inputs from a user, and further operable to generate outputs for presentation to the user. User interface component 525 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 525 may include one or more output devices, including but not limited to a display, a speaker, a haptic feedback mechanism, a printer, any other mechanism capable of presenting an output to a user, or any combination thereof.

Figure 6:
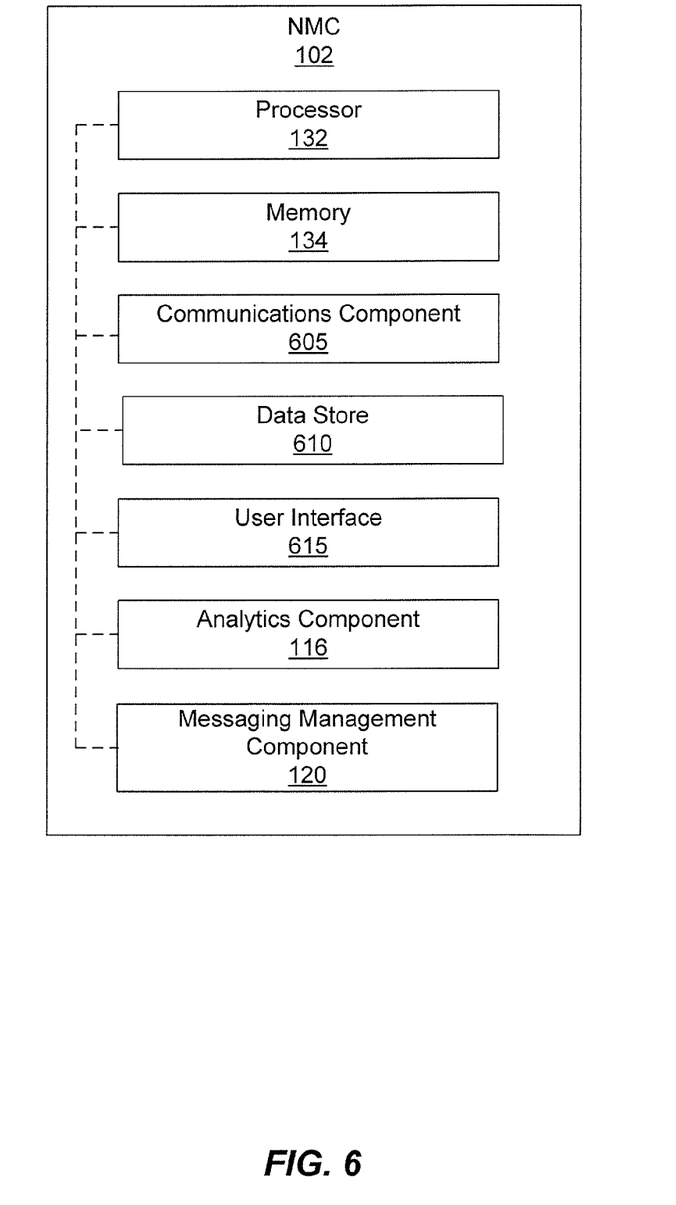
FIG. 6 is a block diagram of an example of an aspect of a network management center (NMC) with a messaging management component in accordance with the present disclosure.

FIG. 6 illustrates an example of NMC 102 for managing inter-network messaging in accordance with the present disclosure. In one aspect, the NMC 102 may include a processor 132 that may be or may include a specially programmed or configured computer device to perform the functions described herein. In one aspect of implementation, NMC 102 may include message management component 120 and its sub-components, such as in specially programmed computer readable instructions or code, firmware, hardware, or some combination thereof.

In an aspect, for example as represented by the dashed lines, features described herein may be implemented in or executed using one or any combination of processor 132, memory 134, communications component 605, and data store 610. For example, analytics management component 116 and/or message management component 120 may be defined or otherwise programmed as one or more processor modules of processor 132. Further, for example, message management component 120 may be defined as a computer-readable medium (e.g., a non-transitory computer-readable medium) stored in memory 134 and/or data store 610 and executed by processor 132. Moreover, for example, inputs and outputs relating to operations of analytics component 116 and/or message management component 120 may be provided or supported by communications component 605, which may provide a bus between the components of computer device or an interface for communication with external devices or components.

In some aspects, NMC 102 may include processor 132 specially configured to carry out processing functions associated with one or more of components and functions described herein. Processor 132 can include a single or multiple set of processors or multi-core processors. Moreover, processor 132 can be implemented as an integrated processing system and/or a distributed processing system.

The NMC 102 further includes memory 134, such as for storing data used herein and/or local versions of applications and/or software and/or instructions or code being executed by processor 132, such as to perform the respective functions of the respective entities described herein. Memory 134 can include any type of memory usable by a computer, such as random access memory (RAM), read only memory (ROM), tapes, magnetic discs, optical discs, volatile memory, non-volatile memory, and any combination thereof.

Further, NMC 102 may include communications component 605 that provides for establishing and maintaining communications with one or more parties utilizing hardware, software, and services as described herein. Communications component 605 may carry communications between components on NMC 102, as well as between user and external devices, such as devices located across a communications network and/or devices serially or locally connected to NMC 102. For example, communications component 605 may include one or more buses, and may further include transmit chain components and receive chain components associated with a transmitter and receiver, respectively, or a transceiver, operable for interfacing with external devices.

Additionally, NMC 102 may further include data store 610, which can be any suitable combination of hardware and/or software, that provides for mass storage of information, databases, and programs employed in connection with aspects described herein. For example, data store 610 may be a data repository for applications not currently being executed by processor 132.

NMC 102 may additionally include a user interface component 615 operable to receive inputs from a user, and further operable to generate outputs for presentation to the user. User interface component 615 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 525 may include one or more output devices, including but not limited to a display, a speaker, a haptic feedback mechanism, a printer, any other mechanism capable of presenting an output to a user, or any combination thereof.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In the above description, the term "application" may include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for supporting communications between mobile computing platforms associated with a fleet of vehicles, comprising:
   receiving, over a communications network and at a network management center, a ready message from a first mobile computing platform, the ready message indicating that the first mobile computing platform is ready to communicate with at least one other mobile computing platform via direct peer-to-peer (P2P) communications;
   receiving, over the communications network and at the network management center, one or more corresponding awake messages from one or more other active mobile computing platforms and an awake message from the first mobile computing platform at least once in a time period, wherein:
      the one or more corresponding awake messages from the one or more other active mobile computing platforms indicate that the one or more other active mobile computing platform is in a state for communicating with other mobile computing platforms via direct P2P communications.
      the awake message from the first mobile computing platform indicates that the first mobile computing platform is in a state for communicating with other mobile computing platforms, and
      the awake message from the one or more other active mobile computing platforms or the awake message from the first mobile computing platform includes an internet protocol (IP) address of the first mobile computing platform, location information of the mobile computing platform, driver identification information associated with the mobile computing platform, and a type of the mobile computing platform;
   compiling, at the network management center, a list of active mobile computing platforms configured for inter-network messaging based on the ready message received from the first mobile computing platform and the one or more corresponding awake messages received from the one or more other active mobile computing platforms
   receiving, over the communications network and at the network management center, a query command from the first mobile computing platform or the at least one other mobile computing platform, the query command comprising at least one parameter for identifying active computing platforms in the compiled list of active mobile computing platforms-based on the at least one parameter;
   identifying a list of active mobile computing platforms in a group based on the at least one parameter and the compiled list, wherein the identified list identifies active mobile computing platforms for direct P2P communications; and
   disseminating, over the communications network, the identified list of the active mobile computing platforms in the group to the first mobile computing platform or the at least one other mobile computing platform based on the query command, wherein the first mobile computing platform or the at least one other mobile computing platform are enabled to perform direct P2P communications in response to receipt of the identified list,
   wherein receiving the query command is received subsequently to receiving the ready message.

2. The method of claim 1, wherein the ready message includes at least one of an internet protocol (IP) address of the first mobile computing platform, location information of the first mobile computing platform, driver identification information associated with the first mobile computing platform, or a type of the first mobile, computing platform.

3. The method of claim 1, wherein the mobile computing platforms are configured to communicate with other mobile computing platforms via a Wi-Fi network, a cellular network, or a satellite network.

4. The method of claim 1, wherein the identified list of active mobile computing platforms is smaller than the compiled list of active mobile computing platforms.

5. An apparatus for supporting communications between mobile computing platforms, comprising:
   a processor;
   a memory in communication with the processor, the memory including instructions executed by the processor to:
   receive, over a communications network and at a network management center, a ready message from a first mobile computing platform, the ready message indicating that the first mobile computing platform is ready to communicate with at least one other mobile computing platform via direct peer-to-peer (P2P) communications;
   receive, over the communications network and at the network management center, one or more corresponding awake messages from one or more other active mobile computing platforms and an awake message from the first mobile computing platform at least once in a time period, wherein:
      the one or more corresponding awake messages from the one or more other active mobile computing platforms indicate that the one or more other active mobile computing platform is in a state for communicating with other mobile computing platforms via direct P2P communications,
      the awake message from the first mobile computing platform indicates that the first mobile computing platform is in a state for communicating with other mobile computing platforms, and
      the awake message from the one or more other active mobile computing platforms or the awake message from the first mobile computing platform includes an internet protocol (IP) address of the first mobile computing platform, location information of the mobile computing platform, driver identification information associated with the mobile computing platform, and a type of the mobile computing platform;
   compile, at the network management center, a list of active mobile computing platforms configured for inter-network messaging based on the ready message received from the first mobile computing platform and the one or more corresponding awake messages received from the one or more other active mobile computing platforms;

receive, over the communications network and at the network management center, a query command from the first mobile computing platform or the at least one other mobile computing platform, the query command comprising at least one parameter for identifying active computing platforms in the compiled list of active of active mobile computing platforms based on the at least one parameter;

identifying a list of active mobile computing platforms in a group based on the at least one parameter and the compiled list, wherein the identified list, identifies active mobile computing platforms for direct P2P communications; and disseminate, over the communications network, the identified list of the active mobile computing platforms in a group to the first mobile computing platform or the at least one other mobile computing, platform based on the query command, wherein the first mobile computing platform or the at least one other mobile computing platform are enabled to perform direct P2P communications in response to receipt of the identified list, wherein receiving the query command is received subsequently to receiving the ready message.

6. The apparatus of claim 5, wherein the, ready message includes at least one of an internet protocol (IP) address of the first mobile computing platform, location information of the first mobile computing platform, driver identification information associated with the first mobile computing platform, or a type of the first mobile computing platform.

7. The apparatus of claim 5, wherein the mobile computing platforms are configured to communicate with other mobile computing platforms via a Wi-Fi network, a cellular network, or a satellite network.

8. The apparatus of claim 5, wherein the identified list of active mobile computing platforms is smaller than the compiled list of active mobile computing platforms.

9. A non-transitory computer-readable medium having instructions thereon for wireless communication, the instructions comprising:

code for receiving, over a communications network and at a network management center, a ready message from a first mobile computing platform, the ready message indicating that the first mobile computing platform is ready to communicate with at least one other mobile computing platform via direct peer-to-peer (P2P) communications;

code for receiving, over the communications network and at the network management center, one or more corresponding awake messages from one or more other active mobile computing platforms and an awake message from the first mobile computing platform at least once in a time period, wherein:

the one or more corresponding awake messages from the one or more other active mobile computing platforms indicate that the one or more other active mobile computing platform is in a state for communicating with other mobile computing platforms via direct P2P communications, the awake message from the first mobile computing platform indicates that the first mobile computing platform is in a state for communicating with other mobile computing platforms, and the awake message from the one or more other active mobile computing platforms or the awake message from the first mobile computing platform includes an Internet protocol (IP) address of the first mobile computing platform, location information of the mobile computing platform, driver identification information associated with the mobile computing platform, and a type of the mobile computing platform;

code for compiling, at the network management center, a list of active mobile computing platforms configured for inter-network messaging based on the ready message and the one or more corresponding awake messages received from the one or more other active mobile computing platforms;

code for receiving, over the communications network and at the network management center, a query command from the first mobile computing platform or the at least one other mobile computing platform, the query command comprising at least one parameter for identifying active computing platforms in the compiled list of active mobile computing platforms based on the at least one parameter;

code for identifying a list of active mobile computing platforms in the group based on the at least one parameter and the complied list, wherein the identified list identifies active mobile computing platforms for direct P2P communications; and code for disseminating, over the communications network, the list of the active mobile computing platforms in the group to the first mobile computing platform or the at least one other mobile computing platform based on the query command wherein the first mobile computing platform or the at least one other mobile computing platform are enabled to perform direct P2P communications in response to receipt of the identified list, wherein receiving the query command is received subsequently to receiving the ready message.

10. The computer-readable medium of claim 9, wherein the ready message includes at least one of an internet protocol (IP) address of the first mobile computing platform, location it nation of the first mobile computing platform, driver identification information associated with the first mobile computing platform, or a type of the first mobile computing platform.

11. The computer-readable medium of claim 9, wherein the mobile computing platforms are configured to communicate with other mobile computing, platforms via a Wi-Fi network, a cellular network, or a satellite network.

12. The computer-readable medium of claim 9, wherein the identified list of active mobile computing platforms is smaller than the compiled list of active mobile computing platforms.

* * * * *